United States Patent
Baumgart et al.

(10) Patent No.: US 9,109,638 B2
(45) Date of Patent: Aug. 18, 2015

(54) SWITCHABLE COUPLING, IN PARTICULAR FOR PASSENGER VEHICLE AUXILIARY ASSEMBLIES

(75) Inventors: Rico Baumgart, Limbach-Oberfrohna (DE); Peter Tenberge, Chemnitz (DE); Joerg Aurich, Chemnitz (DE)

(73) Assignee: Volkswagen AG, Wolfsburg (DE)

( * ) Notice: Subject to any disclaimer, the term of this patent is extended or adjusted under 35 U.S.C. 154(b) by 267 days.

(21) Appl. No.: 13/885,632

(22) PCT Filed: Nov. 15, 2011

(86) PCT No.: PCT/DE2011/075272
§ 371 (c)(1),
(2), (4) Date: Jul. 31, 2013

(87) PCT Pub. No.: WO2012/065605
PCT Pub. Date: May 24, 2012

(65) Prior Publication Data
US 2013/0299296 A1 Nov. 14, 2013

(30) Foreign Application Priority Data
Nov. 16, 2010 (DE) ...................... 20 2010 012 900 U

(51) Int. Cl.
*F16D 11/00* (2006.01)
*F16D 27/08* (2006.01)
(Continued)

(52) U.S. Cl.
CPC ................ *F16D 13/40* (2013.01); *F16D 43/16* (2013.01); *F16D 47/00* (2013.01)

(58) Field of Classification Search
CPC ......... F16D 13/40; F16D 47/00; F16D 43/16; F16D 27/112; F16D 27/118; F16D 2023/0687
USPC .............. 192/48.2, 48.3, 58.1, 84.961, 84.92, 192/105 BB, 105 CD
See application file for complete search history.

(56) References Cited

U.S. PATENT DOCUMENTS

| 3,724,621 A | 4/1973 | Heidorn |
| 4,044,872 A | 8/1977 | Punsmann et al. |

(Continued)

FOREIGN PATENT DOCUMENTS

| DE | 619 879 C | 10/1935 |
| DE | 637 795 C | 11/1936 |

(Continued)

OTHER PUBLICATIONS

DE619879 (translation by FLS, Mar. 2015)—Orenstein & Koppel Akt. (Sep. 19, 1935).*

(Continued)

*Primary Examiner* — Robert Hodge
*Assistant Examiner* — Tinh Dang
(74) *Attorney, Agent, or Firm* — Michael Soderman

(57) ABSTRACT

A switchable coupling, in particular for vehicle auxiliary assemblies, is provided. The coupling includes an actuating system actuated electrically, mechanically, pneumatically or hydraulically between a driving element and an output element, and a switching element movable between switching start and end positions counter to the force of one or more resetting elements upon actuation of the actuating system. In the end position, the switching element connects the driving and output elements such that the output element and an auxiliary coupling connected thereto rotate with the driving element. After deactuation, locking bodies located on the auxiliary coupling produce an connection between the driving and output elements which continues to conduct torque between the driving and output elements. The connection is interrupted only when the rotational speed of the driving element falls below a limit value. The coupling does not require a permanent supply of power in the open or closed state.

10 Claims, 12 Drawing Sheets

(51) Int. Cl.
*F16D 27/112* (2006.01)
*F16D 13/40* (2006.01)
*F16D 43/16* (2006.01)
*F16D 47/00* (2006.01)

(56) References Cited

U.S. PATENT DOCUMENTS

| | | | |
|---|---|---|---|
| 4,383,596 A | 5/1983 | Jaeckel | |
| 4,592,458 A | 6/1986 | Matsuki et al. | |
| 5,014,841 A | 5/1991 | Gillespie | |
| 6,786,316 B2 * | 9/2004 | Jacobson et al. | 192/84.961 |
| 2003/0196863 A1 * | 10/2003 | Faller et al. | 192/48.3 |

FOREIGN PATENT DOCUMENTS

| | | |
|---|---|---|
| DE | 25 15 351 B1 | 5/1976 |
| DE | 29 17 448 A1 | 11/1980 |
| DE | 34 27 091 A1 | 2/1985 |
| DE | 10 2008 031 527 A1 | 1/2010 |
| EP | 1 378 677 A2 | 1/2004 |
| WO | WO 2005/124176 A1 | 12/2005 |
| WO | WO 2008/014294 A2 | 1/2008 |

OTHER PUBLICATIONS

Japanese/European/German-language Written Opinion (including PCT/IB/326, PCT/IB/338, PCT/IB/373, and PCT/ISA/237) dated May 30, 2013 (fourteen (14) pages).

Corresponding International Search Report with English Translation dated May 4, 2012 (four (4) pages).

* cited by examiner

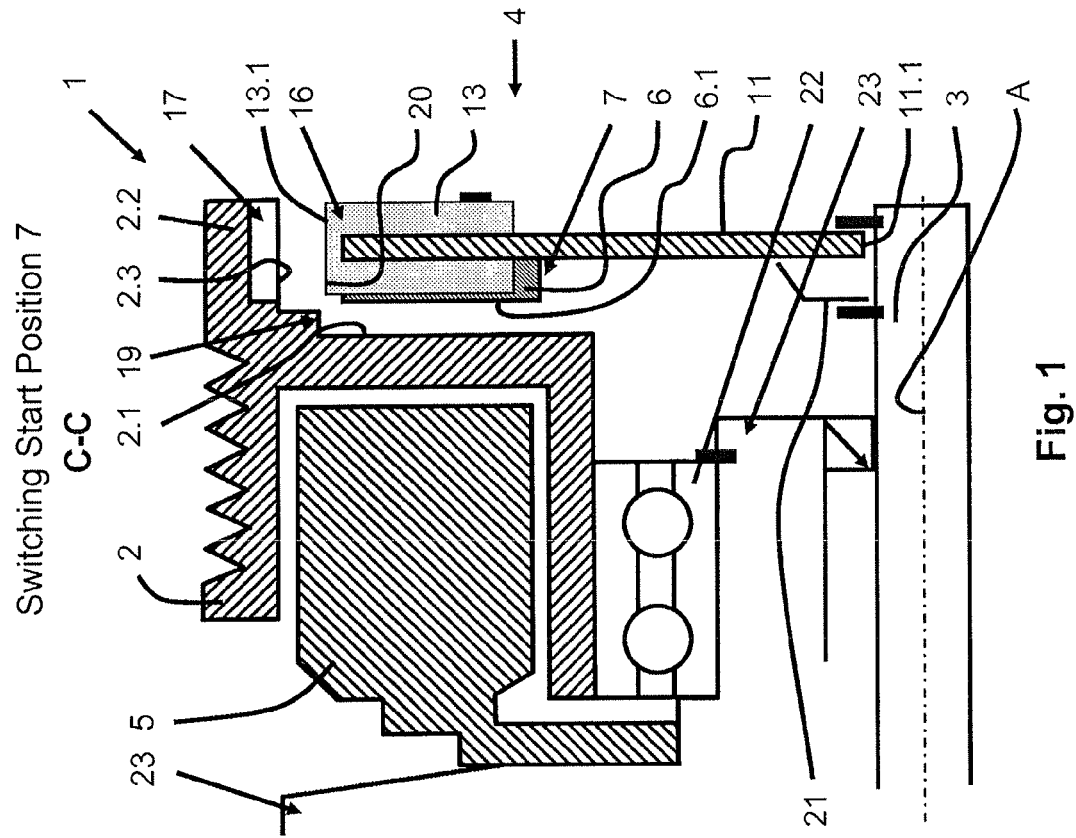
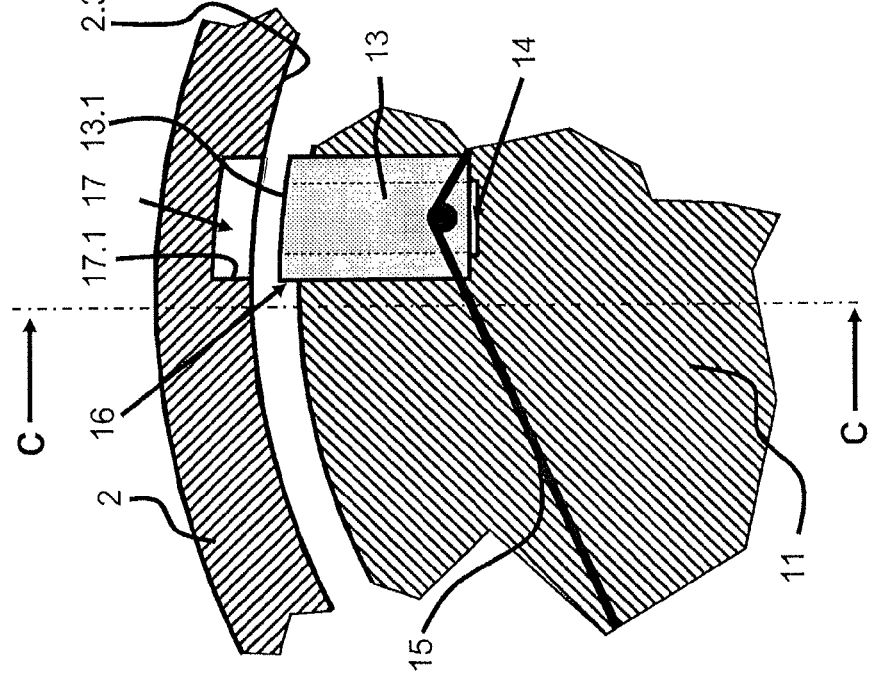

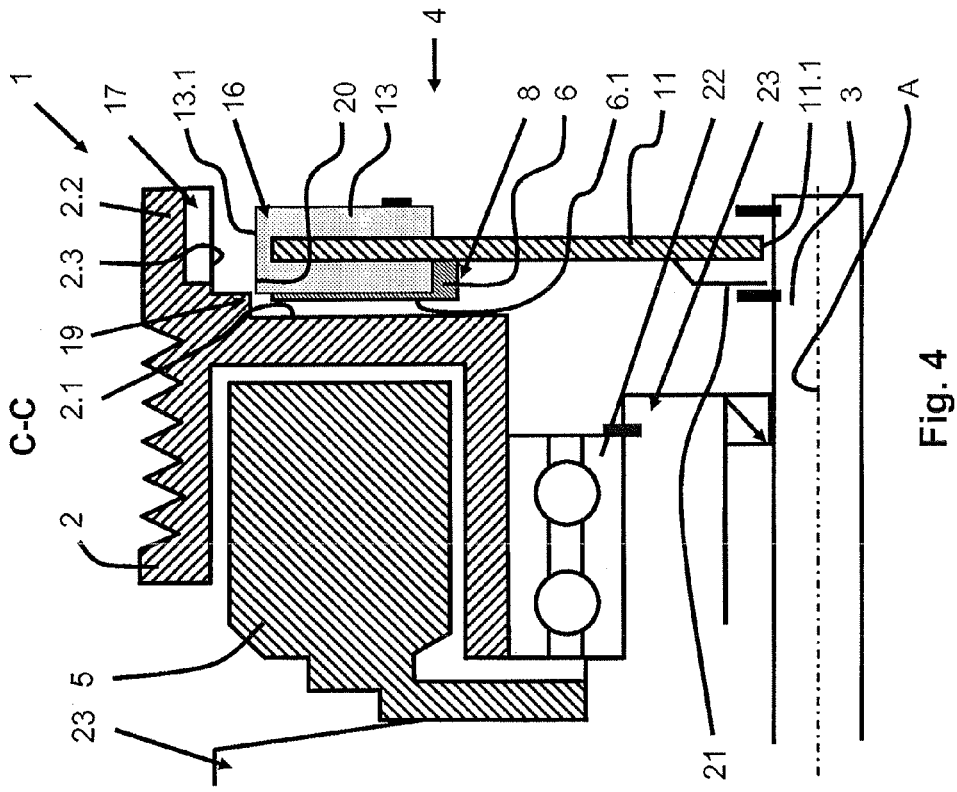
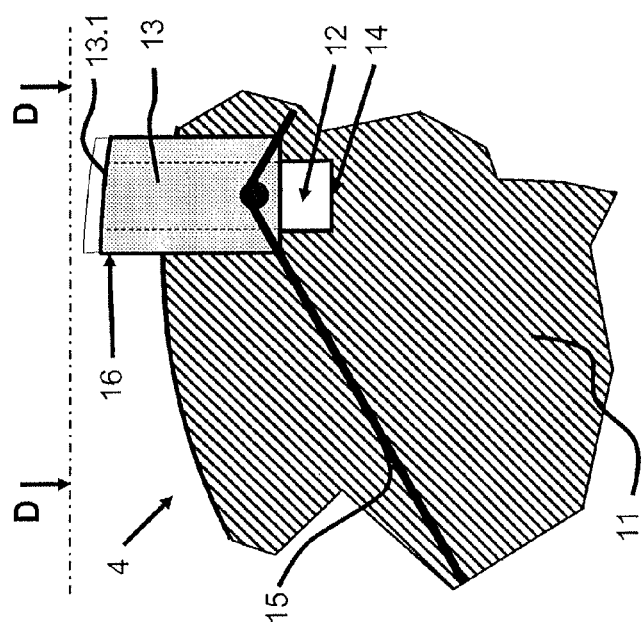
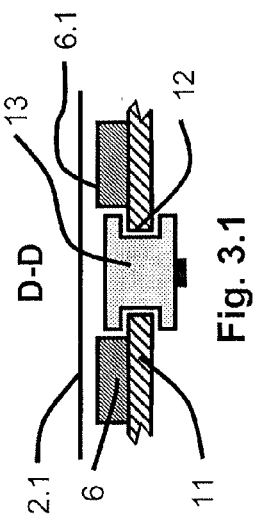

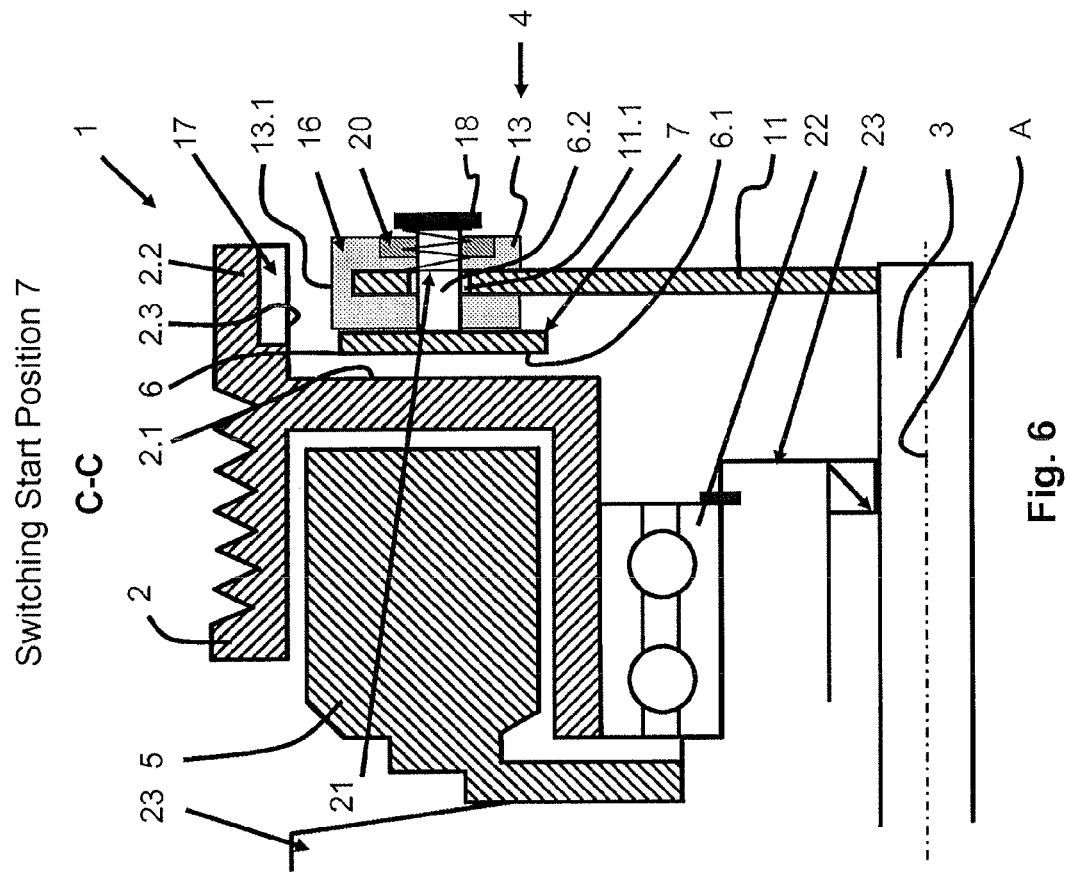
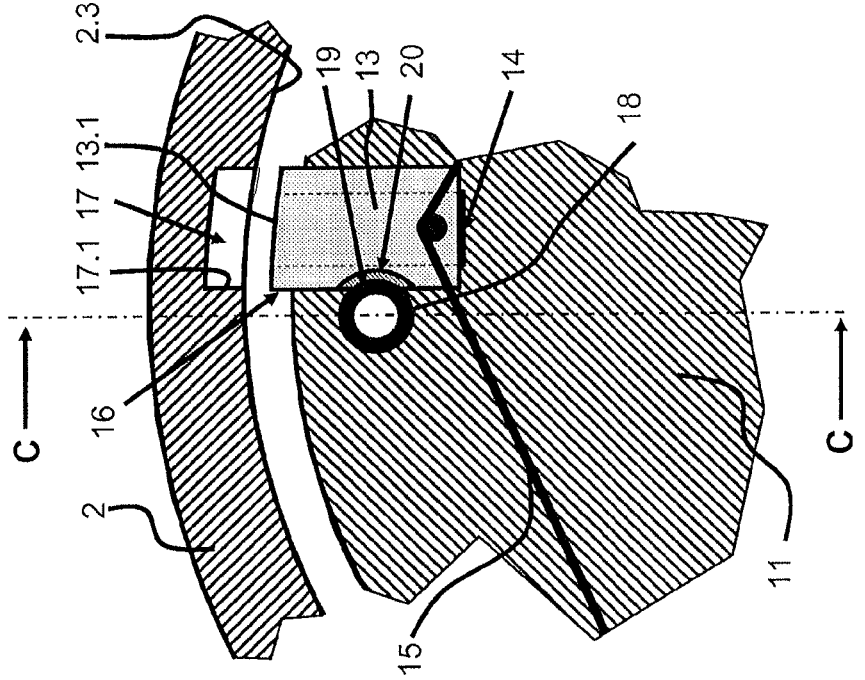

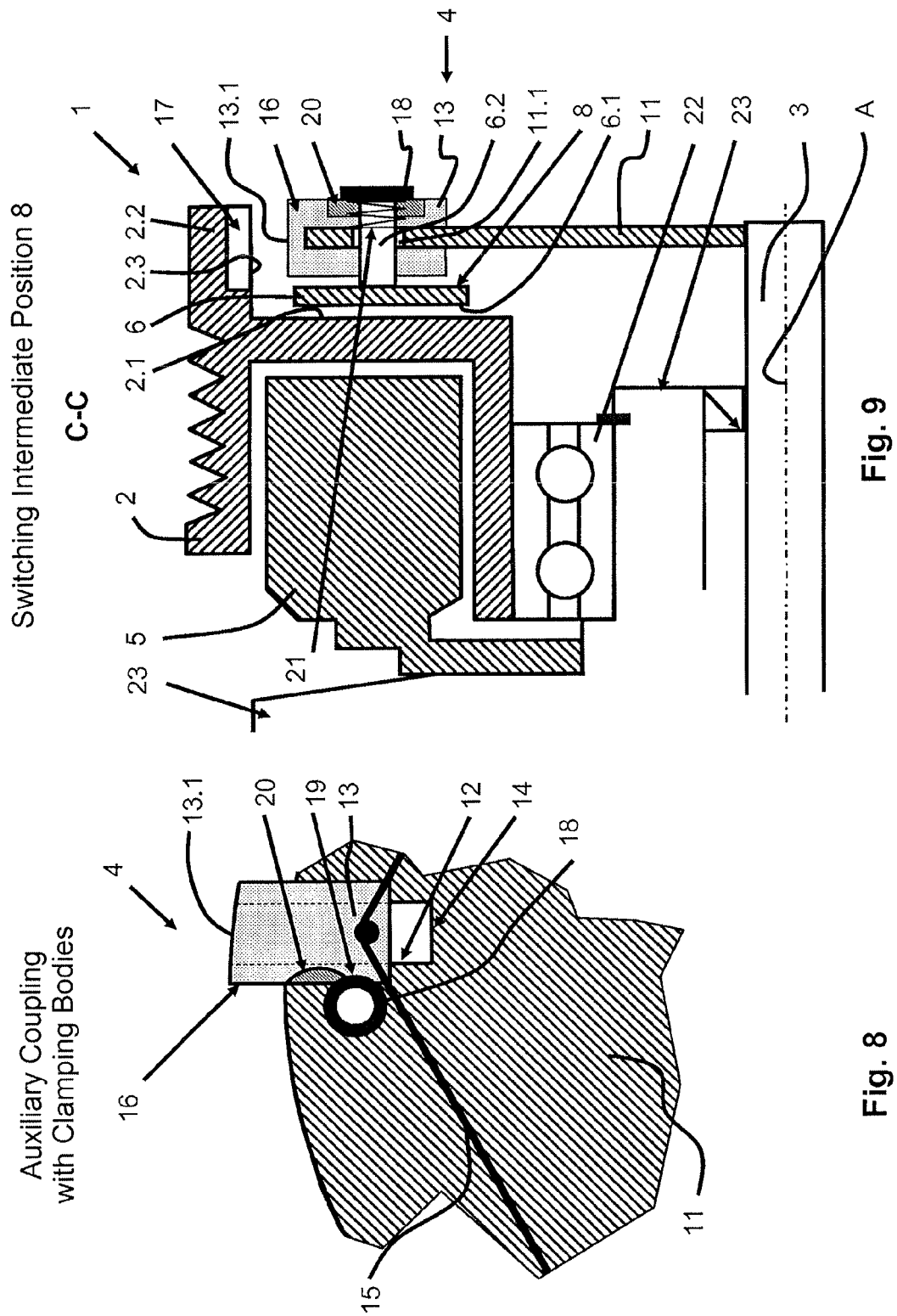

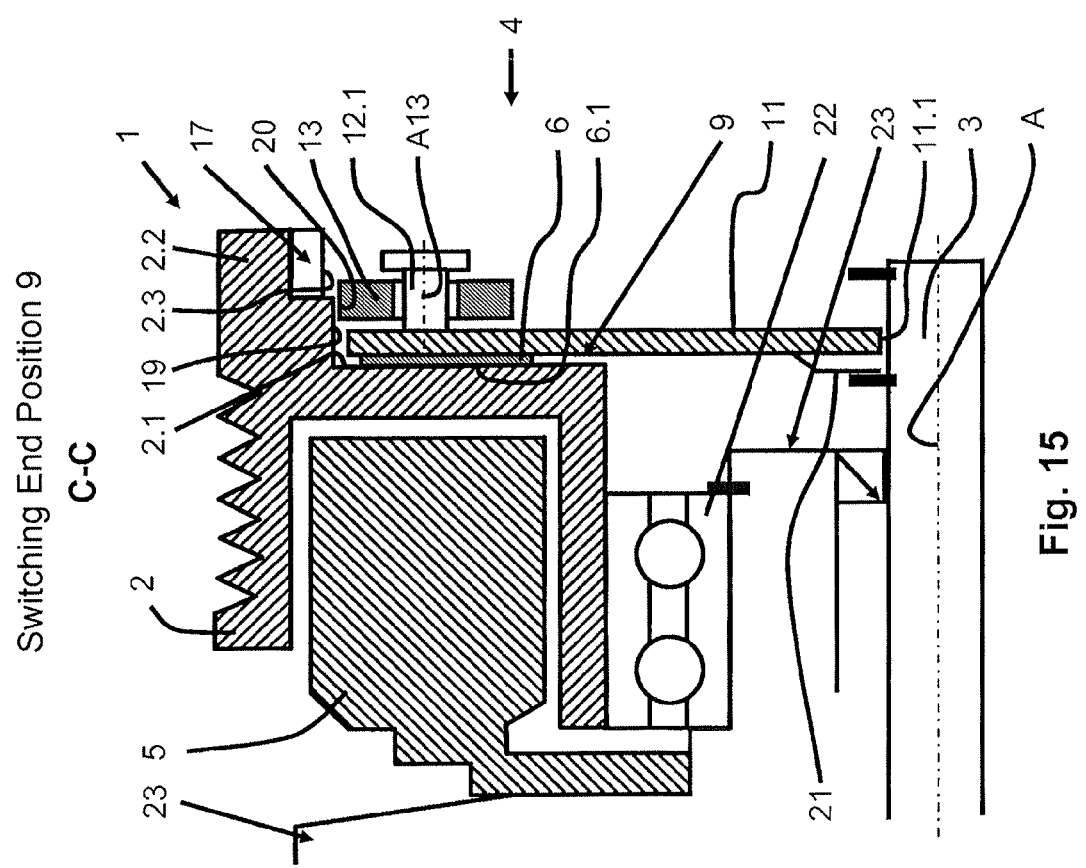

SWITCHABLE COUPLING, IN PARTICULAR FOR PASSENGER VEHICLE AUXILIARY ASSEMBLIES

CROSS REFERENCE TO RELATED APPLICATIONS

This application is national phase of PCT International Application No. PCT/DE2011/075272, filed Nov. 15, 2011, which claims priority under 35 U.S.C. §119 from German Patent Application No. DE 20 2010 012 900.1, filed Nov. 16, 2010, the entire disclosures of which are herein expressly incorporated by reference.

BACKGROUND AND SUMMARY OF THE INVENTION

The invention relates to a switchable coupling, particularly for auxiliary assemblies in passenger cars, having an electrically, mechanically, pneumatically or hydraulically actuated activation system, between a drive element, for example structured as a pulley, and a power take-off element, wherein the activation system comprises a switching member that can be moved, when the activation system is actuated, counter to the force of one or more reset elements, such as springs, for example, between a switching start position and a switching end position, wherein the switching member, in the switching end position, produces an operative connection between the drive element and the power take-off element, so that when the drive element is rotating, the power take-off element and an auxiliary coupling connected with the power take-off element are put into rotational motion, wherein after de-actuation of the activation system, the locking elements situated on the auxiliary coupling produce an operative connection between the drive element and the power take-off element by friction fit and/or shape fit, so that even after de-actuation of the activation system, a torque can be passed from the drive element to the power take-off element, wherein the operative connection is only interrupted when the speed of rotation of the drive element drops below a limit value.

Similar couplings are used, for example in passenger cars, for turning on auxiliary assemblies, such as, for example, a coolant compressor, and are driven by the internal combustion engine by way of a belt drive. In order to separate the auxiliary assemblies from the belt drive when they are not in use, and thereby to save drive energy, switchable couplings, as described in European patent document EP 1378 677 A2, for example, are used. These couplings are switched using an electrically activated magnetic coil. They have the disadvantage that at least in one switching position for the switching state "coupling=closed" or the switching state "coupling=open," the electrically actuated activation system must have current applied to it permanently, and thereby it consumes energy, because in the switched state of the magnetic coil, electrical power must be permanently applied, and this leads to increased fuel consumption in the case of a passenger car.

In German patent document DE 637 795 A, a coupling is described that comprises an activation system with which a friction coupling can in turn be switched. Using this friction coupling, a connection is produced between a drive element and a power take-off element. An auxiliary coupling connected with the power take-off element has movable centrifugal weights, which produce a force-fit operative connection between the drive element and the power take-off element starting from a specific speed of rotation of the power take-off element, as a result of the centrifugal forces in effect, so that a torque can be transferred from the drive element to the power take-off element. As soon as this operative connection has been produced, the friction coupling can be released. The disadvantage of this coupling now consists in that no device with which the centrifugal weights can be reliably brought out of the operative connection between the drive element and the power take-off element, below a specific speed of rotation or when shutting off the coupling, is provided. Furthermore, no shape-fit torque transfer is described in this coupling, and therefore the ability to transfer high torques, while simultaneously requiring little construction space, is not guaranteed. Furthermore, at low speeds of rotation and the low centrifugal forces connected with this, the case can occur that the friction forces in the operative connection are not sufficient to reliably transfer the required power take-off torque. Because, in the case of this solution, an operative connection between the drive element and the power take-off element can be produced, using the centrifugal weights, even when the drive element and the power take-off element have greatly different speeds of rotation, a shock and therefore great component stresses can be caused at that moment when the centrifugal bodies enter into the operative connection.

From documents DE 619 879 A (Germany), U.S. Pat. No. 5,014,841 A (United States), DE 34 27 091 A1 (Germany), WO 2008/014 294 A2 (International), and DE 25 15351 C2 (Germany), couplings are known in which clamping elements or activation organs that can be radially activated are structured as rotationally movable clamping bodies and can be moved out counter to the spring force of a spring, wherein the clamping elements or activation organs in these couplings are structured exclusively as auxiliary organs and do not serve directly for transfer of the torque.

In German patent documents DE 10 2008 031 527 A1 and DE 29 17 448 A1, centrifugal force couplings are described, which have centrifugal weights that can be pivoted into a switching position in which they engage. The disadvantage of these couplings consists in that the centrifugal weights move exclusively on the basis of the engaging centrifugal forces, because no auxiliary devices are provided on the couplings, with which devices turning them on or off can be influenced.

The invention is therefore based on the task of developing a switchable coupling, particularly with an electrically, mechanically, pneumatically or hydraulically actuated activation system, in which the activation system has electrical power applied to it or must be mechanically actuated or activated with pneumatic or hydraulic pressure only during the closing and opening process, because the switchable coupling afterwards holds itself in the decisive switching positions for the switching states "coupling=closed" and "coupling=open" on the basis of its structure, and therefore power is not permanently required, neither in the open nor in the closed state. Furthermore, in the case of the coupling according to the invention, the torque is supposed to be reliably transferred from the drive element to the power take-off element in the state "coupling=closed." Furthermore, the operative connection between the drive element and the power take-off element is supposed to be reliably interrupted ("coupling=open"), using a reset element, as soon as the speed of rotation of the drive element drops below a specific limit value. Furthermore, no shocks or impermissibly high component stresses should occur during switching of the coupling.

This task is accomplished, according to the invention, by a coupling having an electrically, mechanically, pneumatically or hydraulically actuated activation system, which has a switching member that stands in connection with the power take-off element, which member can be moved, by actuation of the activation system, between a switching start position and a switching end position, counter to the force of one or more energy-storing reset elements, such as reset springs, for example, from the switching start position to the switching end position.

If, for example, the activation element is configured in the form of an electromagnet, movement of the switching member counter to the force of the reset element takes place when the magnet is actuated, from the switching start position to the switching end position. After de-actuation of the activation element, the switching member is moved from the switching end position to the switching start position, by the force of the reset element.

Furthermore, the coupling according to the invention has an auxiliary coupling that has a flange that stands in connection with the power take-off element. This flange in turn stands in connection with the switching element, in such a manner that a torque can be passed from the drive element, by way of the switching member, to the power take-off element. By the actuation of the activation system, the switching member is moved from the switching start position to the switching end position, counter to the force of one or more reset elements. In the switching end position, a first friction surface situated on the switching member comes into a friction-fit operative connection with a second friction surface disposed on the power take-off element, so that the power take-off element can be driven. Furthermore, one or more holding bolts and/or guides are disposed on the flange, where a locking body sits on each holding bolt or in each guide, so that it can be moved by rotation and/or displacement, and the movement of each locking body is limited, in one direction, by at least one stop on the flange. Furthermore, one or more resilient reset elements are disposed on the flange, which elements press the locking bodies against their stops. The locking bodies and the resilient reset element are structured in such a manner that starting from a specific speed of rotation of the power take-off element, the locking bodies lift off from the stop as the result of the acceleration forces that are in effect, and move counter to the force of one or more reset elements. After de-actuation of the activation system, these locking bodies get into a friction-fit and/or shape-fit operative connection with the drive element, where this operative connection is maintained even after de-actuation of the activation system and the resulting reset of the switching member from the switching end position. From this, the advantage results that without further introduction of energy into the activation element, the switching state "coupling=closed" is maintained, and therefore the torque is reliably transferred from the drive element to the power take-off element, by way of the auxiliary coupling, specifically until the speed of rotation of the drive element and therefore of the power take-off element drops to such an extent that the locking bodies move out of the operative connection with the drive element as the result of the reset force of the reset elements. Under specific conditions, such as, for example, a short time after actuation of the activation system, the case can occur that a significant difference in the speed of rotation is present between the drive element and the power take-off element. This difference in the speed of rotation can lead to the result that a shock occurs at the moment of contact between the locking bodies and the drive element, resulting in very great component stresses. In order to prevent this, each locking body has a first operative surface that comes into contact with a second operative surface, which is situated either on the switching member or on the drive element, when the switching member moves in the direction of the switching end position, so that movement of the locking body about the holding bolt or along the guide groove is avoided, and thereby shock-like unlocking of the locking bodies is prevented.

If the activation system is actuated for a defined period of time, it can be ensured that only a slight difference in speed of rotation between the drive element and the power take-off element is present. Afterward, the switching member is moved in the direction of the switching start position as the result of de-actuation of the activation element, by the force of one or more reset elements. As a result, the two stated operative surfaces on the locking body and on the switching member or the drive element come out of contact, and therefore the locking bodies are able to move about the holding bolt or along the guide groove. Because of the acceleration forces that are in effect, the locking bodies then ultimately get into a friction-fit and/or shape-fit operative connection with the drive element, counter to the force of one or more reset elements, at a minimal difference in speed of rotation, and the torque is therefore transferred from the drive element to the power take-off element, by way of the auxiliary coupling.

Preferably, the resilient reset elements engage on the locking bodies in such a manner that they bring them out of engagement with the drive element below a specific speed of rotation of the power take-off element, even counter to a residual clamping moment.

The advantage of this invention consists in that the activation system no longer has to have electrical current applied to it, to be mechanically activated or to have hydraulic or pneumatic pressure applied to it, after the connection between the drive element and the power take-off element has been produced by the locking bodies. Therefore energy can be saved. Furthermore, this solution is characterized, above all, by a small construction space and low weight.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a partial longitudinal section through a coupling in accordance with an embodiment of the present invention in the region of the bearing of a locking body in the switching start position.

FIG. 2 is a front view of the coupling according to FIG. 1 from the direction of the locking body.

FIG. 3 and FIG. 3.1 are representations of an auxiliary coupling of the FIG. 1 embodiment.

FIG. 4 is a partial longitudinal section through the coupling according to FIG. 1 in a switching intermediate.

FIG. 6 is a diagram through a coupling of another embodiment of the present invention in the region of a bearing of a locking body in the switching start position.

FIG. 7 is a front view of the coupling according to FIG. 6 from the direction of the locking body.

FIG. 8 is a representation of an auxiliary coupling of the FIG. 6 embodiment.

FIG. 9 is a partial longitudinal section through the coupling according to FIG. 6 in a switching intermediate position.

FIGS. 11 to 15 illustrate a further embodiment of the present invention in the manner of FIGS. 6 to 10.

DETAILED DESCRIPTION OF THE DRAWINGS

Embodiment 1

In the preferred Embodiment 1, a coupling is shown whose drive element 2 is driven by a V-rib belt, not shown, by way of a drive motor, also not shown, and with which the drive moment can be transferred to a power take-off element 3, such as a shaft, for example. The torque for driving auxiliary assemblies of the vehicle, such as a coolant compressor, for example, can be made available by the power take-off shaft 3.

Figure 5:
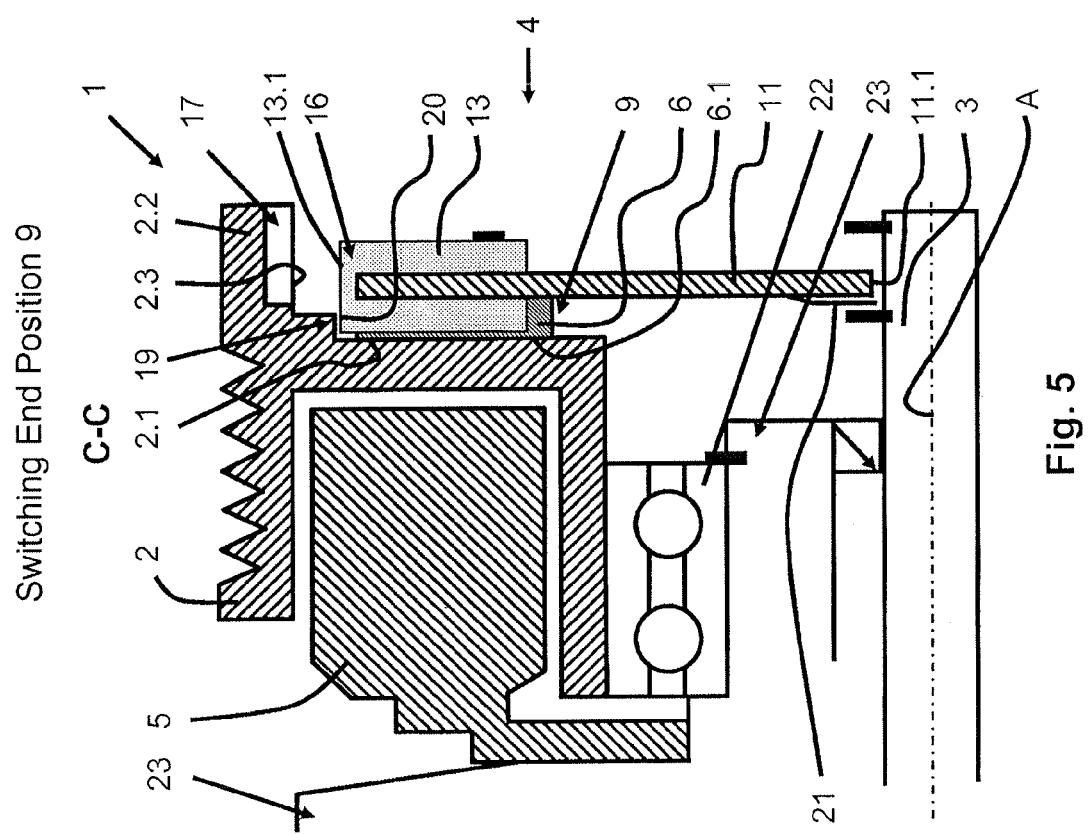
FIG. 5 is a partial longitudinal section of the coupling according to FIG. 1 in the switching end position.

For this purpose, Embodiment 1 presented and described here has an auxiliary coupling 4 as well as an activation system 5, which is configured here in the form of an electrically activated magnetic coil. In Embodiment 1 shown, the activation system 5 possesses one or more switching members 6, which are connected with the flange 11. Furthermore, a reset element 21 is disposed between the power take-off element 3 and the flange 11. When the activation element 5 is actuated, the switching member 6 is moved, counter to the force of this reset element 21, along the longitudinal axis A,
  from a switching start position 7, in which the connection between the drive element 2 and the power take-off element 3 is interrupted (FIG. 1),
  by way of a switching intermediate position 8 (FIG. 4)
  into a switching end position 9 (FIG. 5), in which a connection between the drive element 2 and the power take-off element 3 exists.

In the switching end position 9 (FIG. 5), a first friction surface 6.1 on the switching element 6 comes into contact with a second friction surface 2.1 on the drive element 2, whereby a friction-fit connection between the drive element 2 and the power take-off element 3 is produced in Embodiment 1, so that the power take-off element 3 can be driven.

When the activation element 5 is de-actuated, the switching member 6 is moved along the longitudinal axis A in the direction of the switching start position 7 by the force of the reset element 21, and therefore the friction-fit connection between the drive element 2 and the power take-off element 3 is cancelled out.

The auxiliary coupling 4 (FIG. 3) has a flange 11, which is connected with the power take-off element 3 in such a manner that the flange 11 can move axially on the power take-off element 3, in the direction of the axis A, and, at the same time, the required torque can be passed to the power take-off element 3 by way of the flange 11. One or more guides 12 are introduced into the flange 11. A locking body 13 is disposed in each guide 12, so that it can be displaced (FIG. 3.1). An operative surface 16 is situated on each locking body. The movement of each locking body 13 along the guide 12 is limited, in one direction, by at least one stop 14 (see FIG. 2) on the flange 11. Furthermore, one or more resilient reset elements 15 are disposed on the flange 11, which elements press the locking body 13 against these stops 14.

The drive element 2 has a collar 2.2 that extends over the auxiliary coupling 4, and one or more grooves 17 are configured on the inside diameter of this collar.

The locking body 13 and the resilient reset element 15 are configured in such a manner that starting from a specific speed of rotation of the power take-off element 3, the locking bodies 13 lift off from the stops 14 and move counter to the force of the reset element 15 in the guides 12, and, finally, each operative surface 16 that is situated on each locking body 13 comes into connection with an operative surface 17.1 in the grooves 17 of the drive element 2.

In Embodiment 1 shown, the case can occur, under some circumstances, that the locking bodies 13 do not engage into the provided grooves 17 immediately, but rather first the operative surface 13.1 situated on each locking body 13 comes into contact with an operative surface 2.3 provided on the drive element. Because, in this case, the forces in effect are not sufficient to drive the assembly connected with the power take-off element 3, a difference in torque occurs, as a result of which the locking bodies 13 move relative to the grooves 17, so that the locking bodies 13 can engage into the grooves 17 a short time later.

In order to prevent overly early contact of the locking bodies 13 with the drive element 2, each locking body 13 has a first operative surface 20. When the switching member 6 is moved in the direction of the switching end position 9 (FIG. 5), this first operative surface 20 comes into contact with a second operative surface 19 on the drive element 2, starting from a switching intermediate position 8 (FIG. 4), specifically in such a manner that as a result, movement of the locking body 13 along the guide 12 is hindered. Only when the activation element 5 is de-actuated, and, as a result, the switching member 6 moves out of the switching end position 9 in the direction of the switching start position 7, do these two operative surfaces 19 and 20 get out of contact again, starting with the switching intermediate position 8, and therefore the locking bodies 13 now move in the guides 12 as the result of acceleration forces, and come into an operative connection, with their operative surface 16, with the operative surface 17.1 in the groove 17, and thereby the torque introduced by the drive element 2 is now transferred to the power take-off element 3, with shape fit, by way of the auxiliary coupling 4.

The drive element 2 is mounted so as to rotate, by way of a bearing 22, on a housing 23 that is fixed on the frame and is only indicated. The power take-off element 3 passes through the housing 23.

It is advantageous if the reset element 15 engages on the locking bodies in such a manner that it brings the locking bodies 13 out of engagement with the groove 17 below a specific speed of rotation of the power take-off element 3, even counter to a residual clamping moment. When the drive motor, not shown, is shut off, the locking bodies are moved back against the stops 14, into their starting position, by the force of the reset elements 15, and the force flow between drive element 2 and power take-off element 3 is interrupted.

The auxiliary assembly of the vehicle, for example the coolant compressor of an air conditioning system, is thereby shut off. During the next starting operation of the vehicle engine, the decision is made by the vehicle electronics whether renewed starting of the air conditioning system is required. If this is the case, the auxiliary assembly is activated by short-term turning on of the activation element 5, and driven by way of the auxiliary coupling 4, which is now self-holding without further need for electricity.

According to further exemplary embodiments, not shown, it is also possible to switch the switching member 6 by a mechanical, hydraulic or pneumatic activation element 5.

Embodiment 2

A further Embodiment 2 differs from Embodiment 1 by the characteristics described below.

Figure 10:
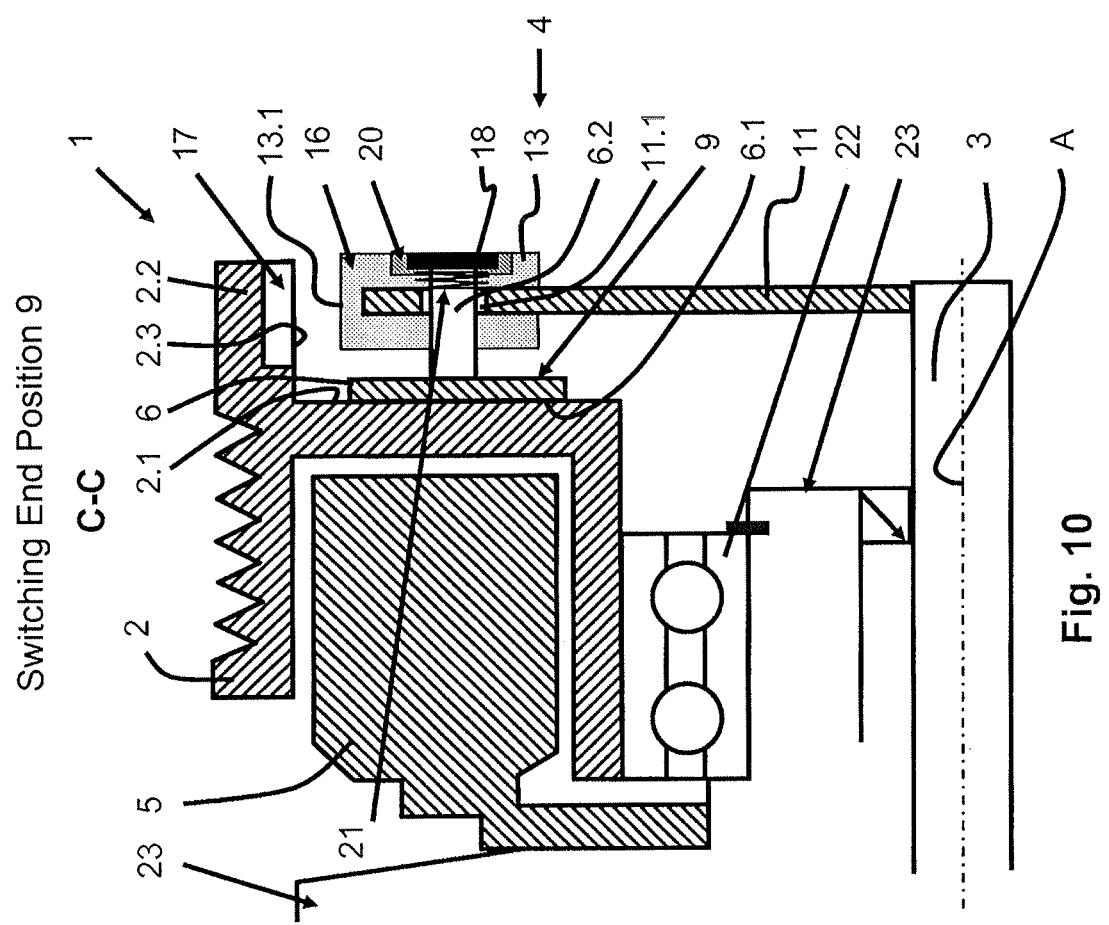
FIG. 10 is a partial longitudinal section of the coupling according to FIG. 6 in the switching end position.

The auxiliary coupling 4 (FIG. 8) has a flange 11, which is firmly connected with the power take-off element 3 in Embodiment 2. The flange 11 has one or more guide regions 11.1 that stand in an operative connection with an axially extending guide region 6.2 on the switching member 6. By this operative connection, the switching member 6 can be displaced in the axial direction, relative to the flange 11, for one thing, and for another, a torque can be transferred to the flange 11 by way of the switching member 6. In this Embodiment 2, one or more reset elements 21 are disposed between the flange 11 and the switching member 6. When the activation element 5 is actuated, the switching member 6 is moved along the longitudinal axis A, out of the switching start position 7 into the switching end position 9 (FIG. 10), counter to the force of these reset elements 21. When the activation element 5 is de-actuated, the switching member 6 is moved back along the longitudinal axis A from the switching end position 9 into the switching start position 7 (FIG. 6), as a result of the force of the reset elements 21.

In Embodiment 2 as shown, just as in Embodiment 1, the case can occur, under some circumstances, that the locking bodies 13 do not engage in the provided grooves 17 immediately, but rather first, the operative surface 13.1 situated on each locking body 13 comes into contact with an operative surface 2.3 affixed to the drive element. Because, in this case, the forces that act during contact are not sufficient to drive the assembly connected with the power take-off element 3, a difference in torque occurs, as a result of which the locking bodies 13 move relative to the grooves 17, so that the locking bodies 13 can engage into the grooves 17 a short time later, and thus the operative surface 16 present in each locking body 13 comes into contact with an operative surface 17.1.

In order to prevent overly early contact of the locking bodies 13 with the drive element 2, the switching member 6 has one or more holding elements 18, with a first operative surface 19 situated on each holding element 18. Furthermore, each locking body 13 has a second operative surface 20. The number of locking bodies 13 corresponds to the number of holding elements 18. In the switching start position 7 (FIG. 6), the holding elements 18 are out of engagement with the locking bodies 13. When the switching member 6 is moved in the direction of the switching end position 9 (FIG. 10), each operative surface 19 comes into contact with a second operative surface 20 that is situated on each locking body 13, starting from a switching intermediate position 8 (FIG. 9), specifically in such a manner that as a result, movement of the locking body 13 along the guide 12 is hindered (FIG. 7). Only when the activation system 5 is de-actuated, and, as a result, the switching member 6 moves out of the switching end position 9 in the direction of the switching start position 7, do these two operative surfaces 19 and 20 get out of contact again, starting with the switching intermediate position 8, and therefore the locking bodies 13 can now move in the guides 12 as the result of acceleration forces, and come into an operative connection, with their operative surface 16, which is situated on each locking body 13, with an operative surface 17.1 in the groove 17 in the drive element 2, and thereby the torque introduced by the drive element 2 is now transferred to the power take-off element 3, with shape fit, by way of the auxiliary coupling 4.

Embodiment 3

A further Embodiment 3 differs from Embodiment 1 particularly by a modified auxiliary coupling having the characteristics described below.

Figure 13:
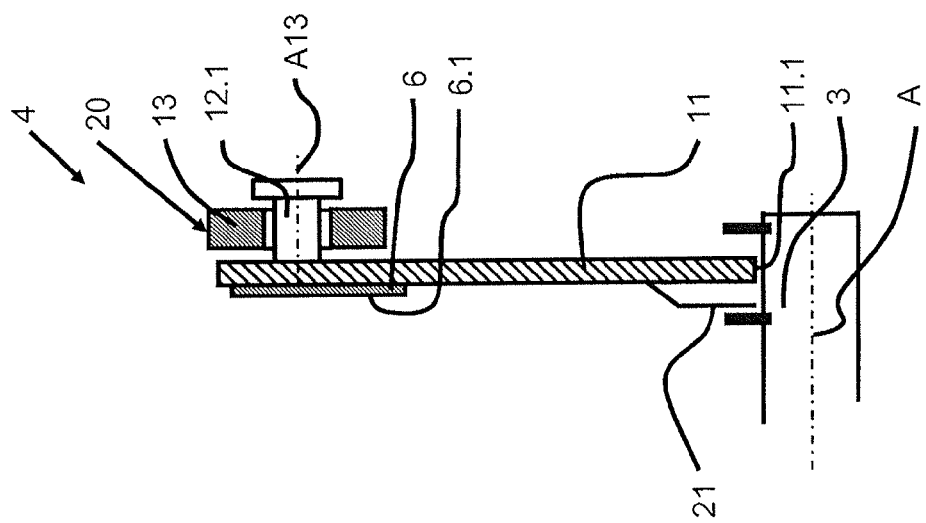

The auxiliary coupling 4 (FIG. 13) has a flange 11, which is connected with the power take-off element 3 in such a manner that the flange can be axially moved on the power take-off element 3, in the direction of the axis A, and, at the same time, the required torque can be passed to the power take-off element 3 by way of the flange 11.

Figure 12:
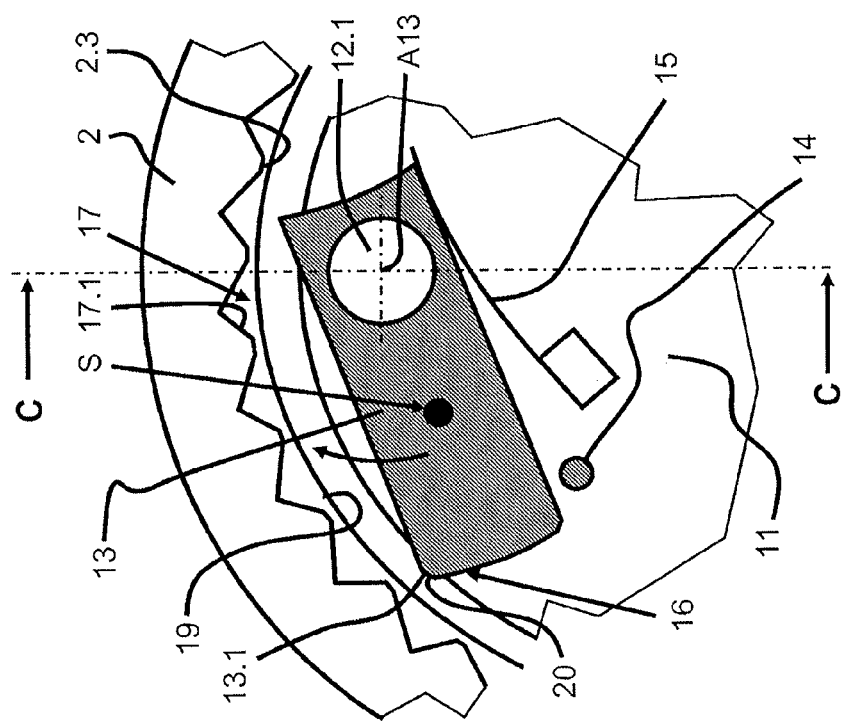

The switching member 6 is firmly connected with the flange 11. One or more holding bolts 12.1 are introduced into the flange 11, with a locking body 13 disposed on each holding bolt 12.1 so as to rotate. The movement of each locking body 13 about the holding bolt 12.1 on the flange 11 is limited in a direction of rotation by at least one stop 14 (see FIG. 12). Furthermore, one or more resilient reset elements 15 are disposed on the flange 11 for each locking body 13, which elements press the locking bodies 13 against these stops 14.

The center of gravity S of each locking body 13 lies outside its axis of rotation A13 about the holding bolt 12.1 (FIG. 12), so that starting from a specific speed of rotation of the power take-off element 3, the locking bodies 13 lift off from the stops 14 and turn radially outward about the holding bolt 12.1, counter to the force of a reset element 15, and finally, each operative surface 16 on the locking body 13 comes into connection with an operative surface 17.1 in the grooves 17 of the drive element 2.

In Embodiment 3 shown, just as in Embodiments 1 or 2, the case can occur, under some circumstances, that the locking bodies 13 do not immediately engage into the grooves 17 provided, but rather first, the operative surface 13.1 situated on each locking body 13 comes into contact with an operative surface 2.3 affixed on the drive element 2. Because, in this case, the forces in effect during contact are not sufficient to drive the assembly connected with the power take-off element 3, a difference in moment occurs, as a result of which the locking bodies 13 move relative to the grooves 17, so that the locking bodies 13 can engage in the grooves 17 a short time later.

Figure 11:
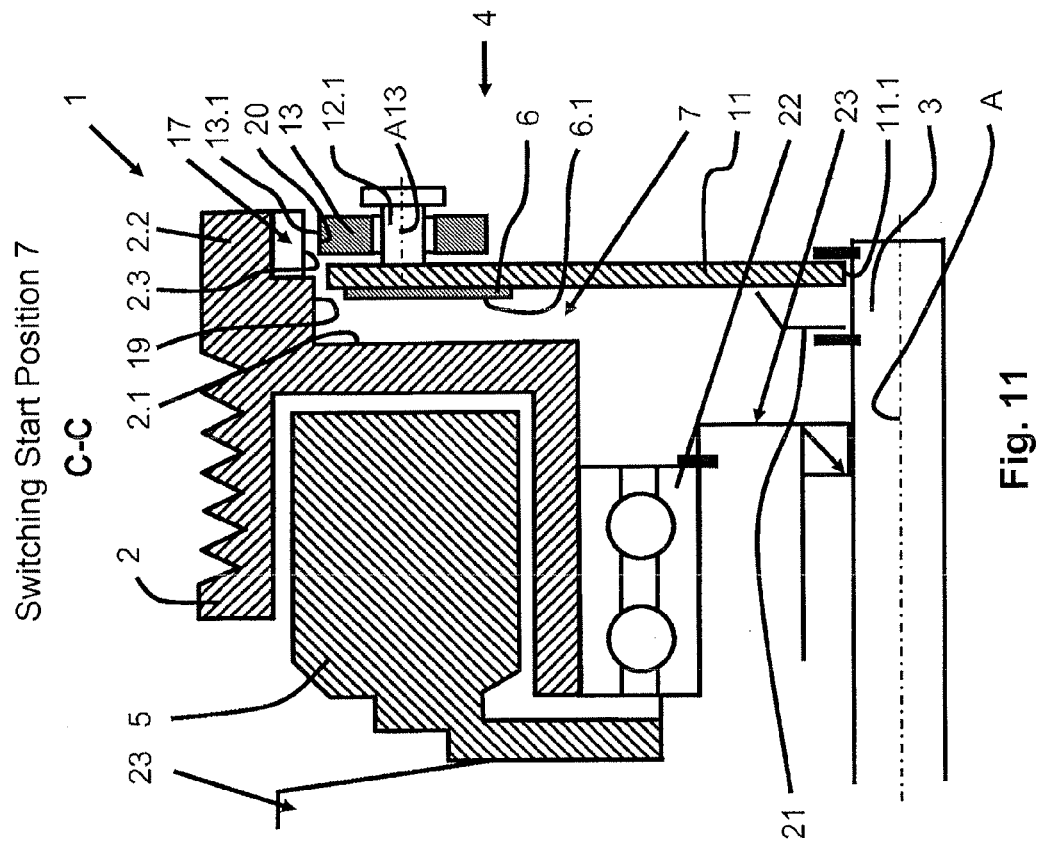
Figure 14:
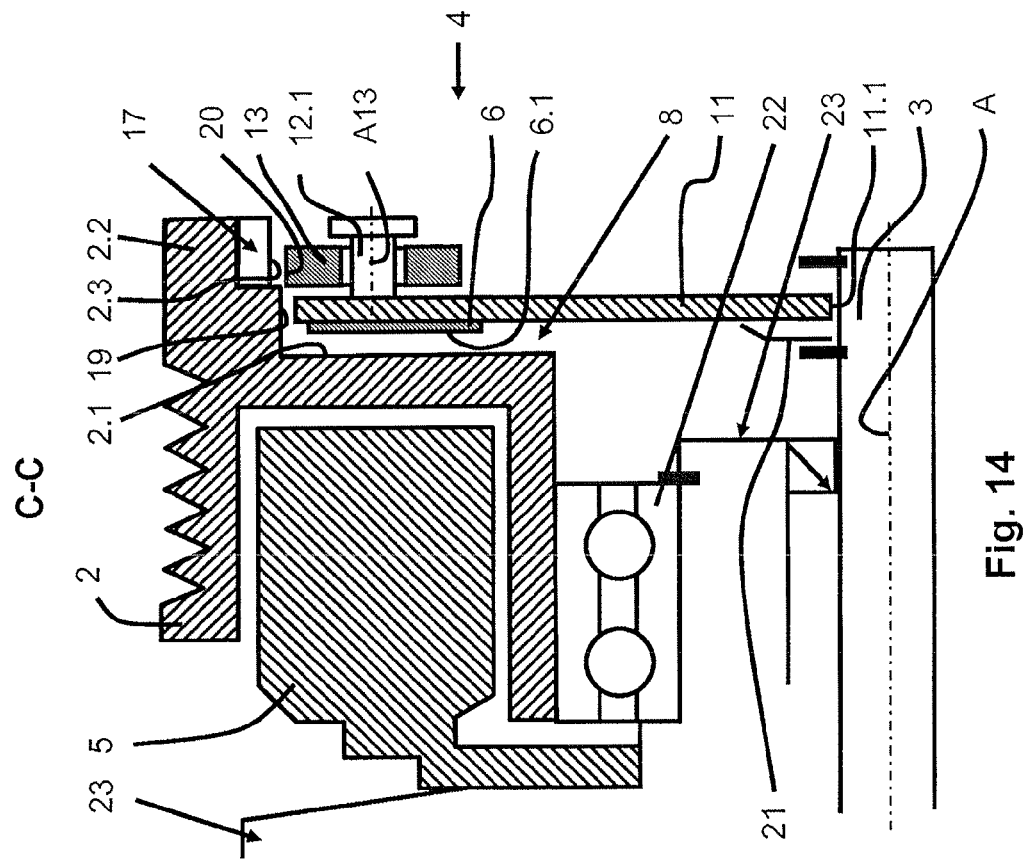

In order to prevent overly early contact of the locking bodies 13 with the drive element 2, the same measures are taken in Embodiment 3 as in Embodiment 1. Accordingly, each locking body 13 has a first operative surface 20. When the switching member 6 is moved in the direction of the switching end position 9 (FIG. 15), this first operative surface 20 comes into contact with a second operative surface 19 on the drive element 2, starting from a switching intermediate position 8 (FIG. 14), specifically in such a manner that as a result, movement of the locking body 13 about the holding bolt 12.1 is hindered. Only when the switching member 6 moves out of the switching end position 9 in the direction of the switching start position 7 (FIG. 11) do these two operative surfaces 19 and 20 get out of contact again, starting with the switching intermediate position 8, and therefore the locking bodies 13 now rotate radially outward about the holding bolts 12.1 as the result of acceleration forces, and come into an operative connection, with their operative surface 16, with the operative surface 17.1 in the groove 17, and thereby the torque introduced by the drive element 2 is now transferred to the power take-off element 3, with shape fit, by way of the auxiliary coupling 4.

Embodiment 4

A further Embodiment 4, here configured particularly as a friction coupling, corresponds, in terms of its essential characteristics, to Embodiment 2, with Embodiment 4 having the differences from Embodiment 2 as described below.

Figure 17:
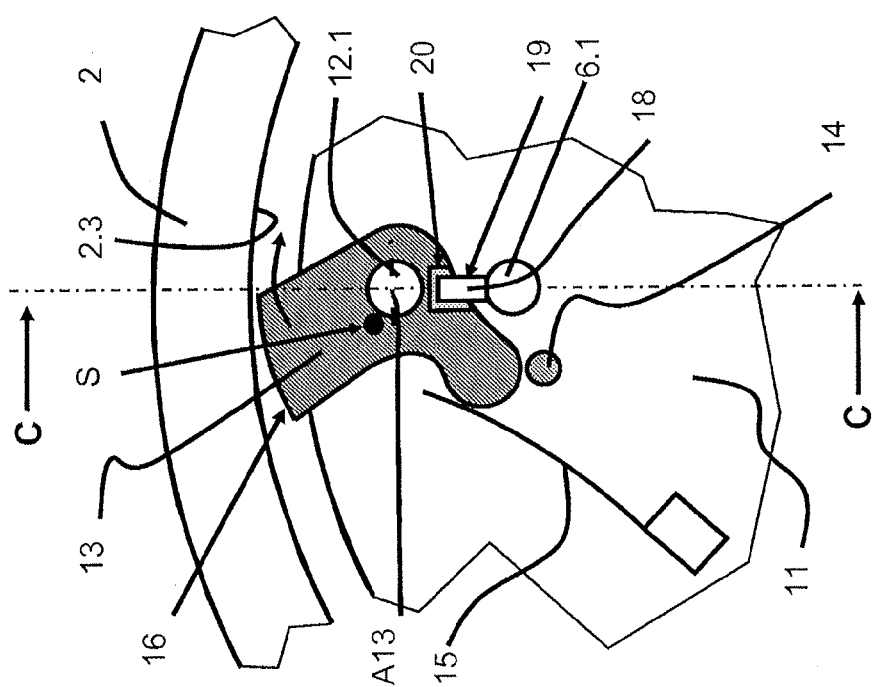

The drive element 2 has a collar 2.2 that extends over the auxiliary coupling 4, on the inside diameter of which collar a circumferential second operative surface 2.3 is configured in Embodiment 4. Multiple holding bolts 12.1 are disposed on the flange 11 of the auxiliary coupling 4, with a locking body 13 disposed so as to rotate on each locking body 13. The movement of each locking body 13 about the holding bolt 12.1 is limited in a direction of rotation by at least one stop 14 (see FIG. 17) on the flange 11. Furthermore, a resilient reset element 15 is disposed on the flange 11 for each locking body 13, which element presses the locking body 13 against this stop 14.

The center of gravity S of each locking body 13 lies outside its axis of rotation A13 about the holding bolt 12.1 (FIG. 17), so that starting from a specific speed of rotation of the power take-off element 3, the locking bodies 13 lift off from the stops 14 and turn radially outward, counter to the force of the reset elements 15, and come into an operative connection, with their operative surface 16, with the second operative surface 2.3 of the drive element 2. By the forces that act in this contact, a friction-fit clamping connection occurs between the drive element 2 and the power take-off element 3, which connection is sufficient to transfer a torque from the drive element 2 to the power take-off element 3.

Figure 16:
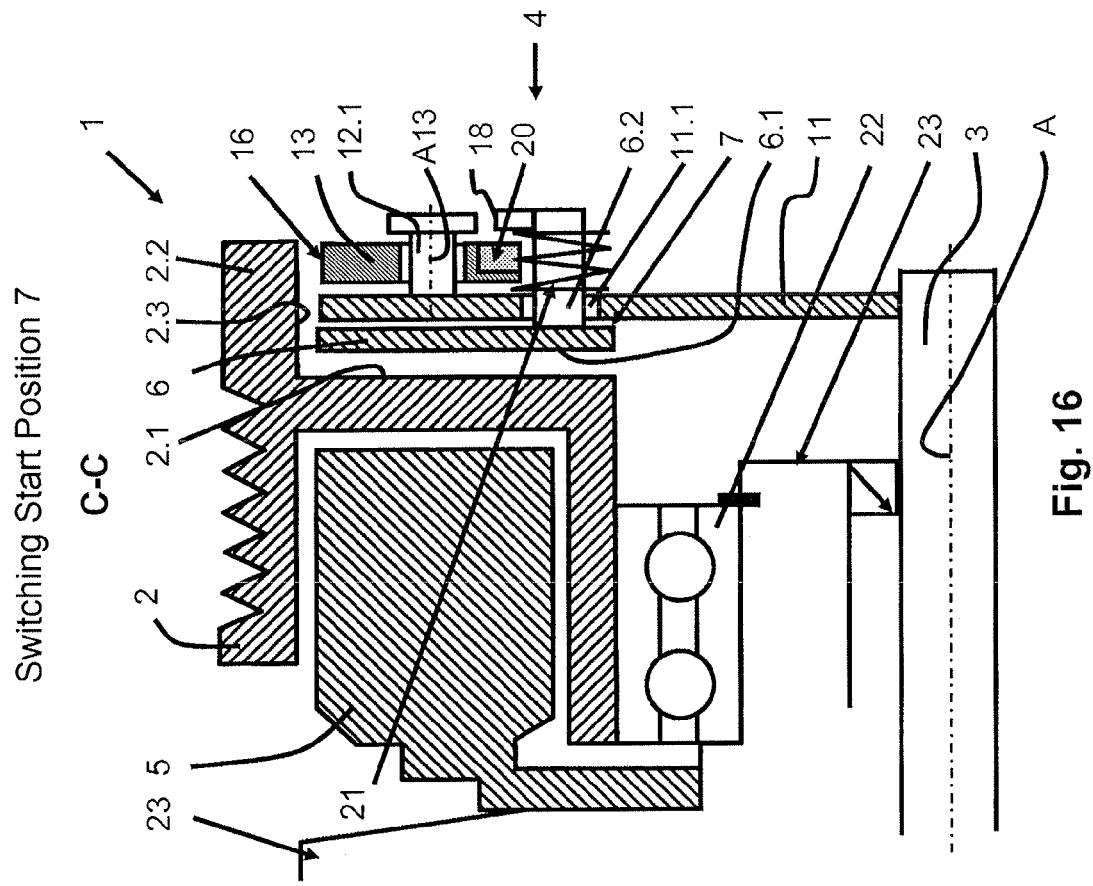
FIGS. 16 to 20 illustrate a further embodiment of the present invention in the manner of FIGS. 6 to 10.
Figure 19:
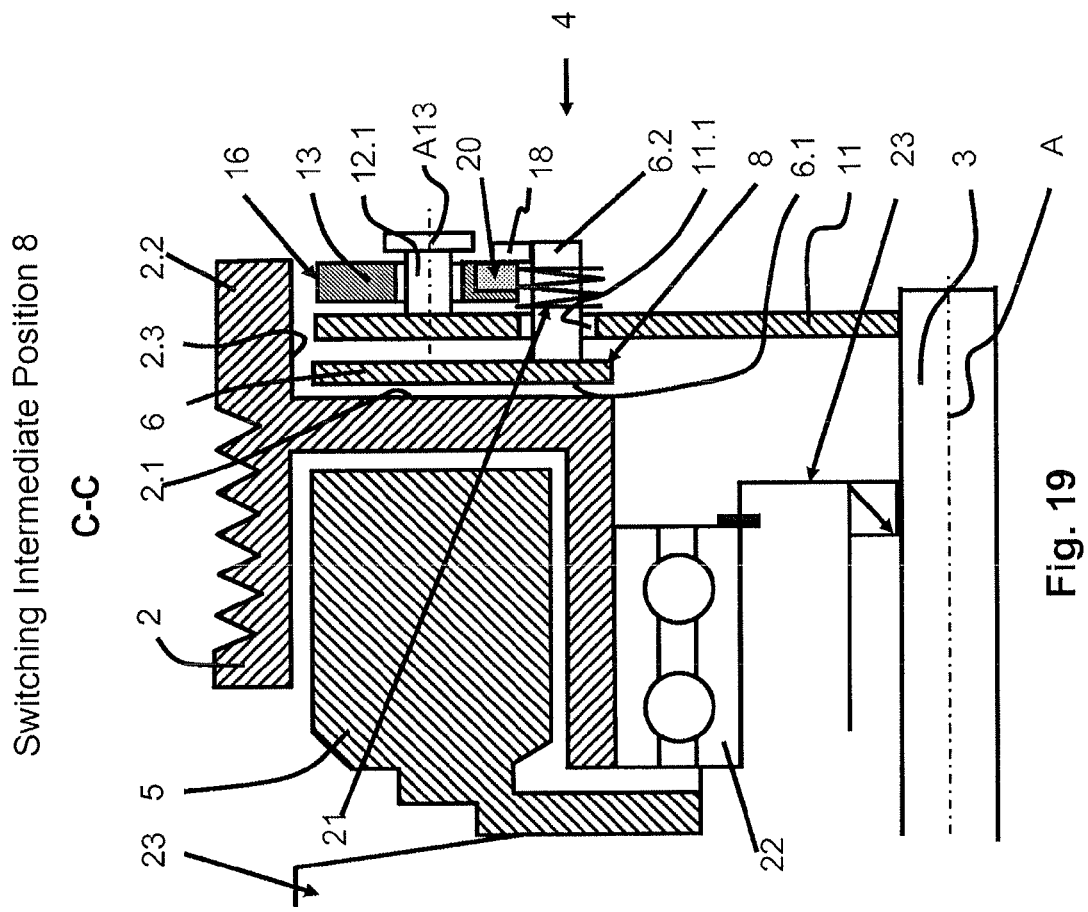
Figure 18:
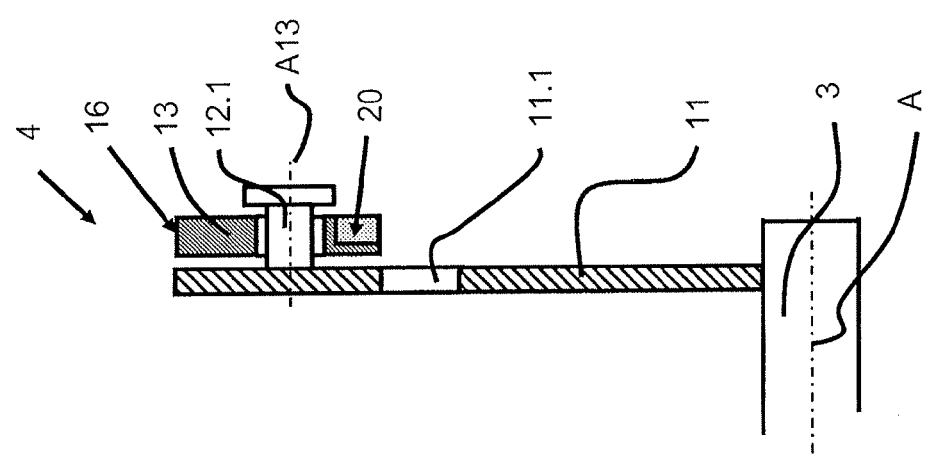
Figure 20:
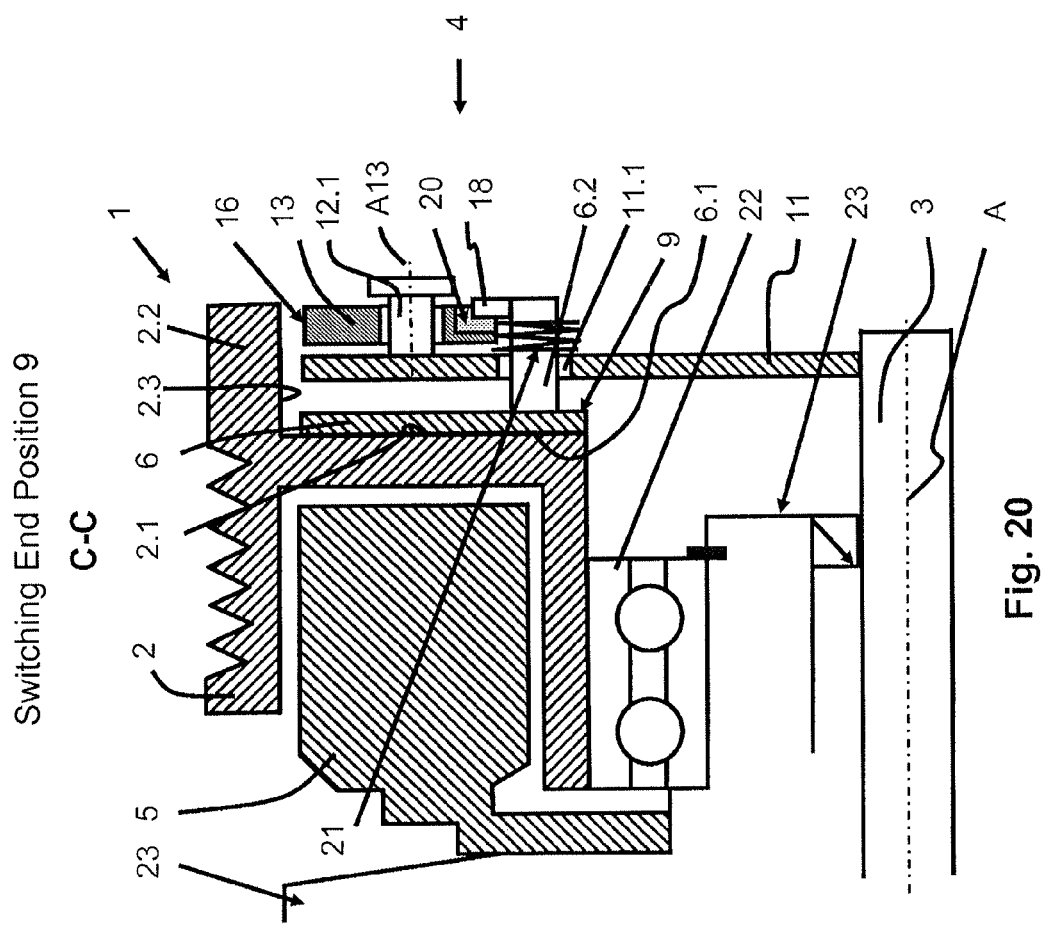

In order to prevent overly early contact of the locking bodies 13 with the drive element 2, the switching member 6 has one or more holding elements 18, with a first operative surface 19 situated on each holding element 18. Furthermore, each locking body 13 has a second operative surface 20. The number of locking bodies 13 corresponds to the number of holding elements 18. In the switching start position 7 (FIG. 16), the holding elements 18 are out of engagement with the locking bodies 13. When the switching member 6 is moved in the direction of the switching end position 9 (FIG. 20), the operative surface 19 comes into contact with a second operative surface 20 on the locking body 13, starting from a switching intermediate position 8 (FIG. 19), specifically in such a manner that as a result, movement of the locking body 13 about the holding bolt 12.1 is hindered. Only when the activation system 5 is de-actuated, and, as a result, the switching member 6 moves out of the switching end position 9 in the direction of the switching start position 7, do these two operative surfaces 19 and 20 get out of contact again, starting with the switching intermediate position 8, and therefore the locking bodies 13 can now rotate about their axis of rotation A13 as the result of acceleration forces, and come into an operative connection, with their operative surface 16, with the second operative surface 2.3, and thereby the torque introduced by the drive element 2 is now transferred to the power take-off element 3, with friction fit, by way of the auxiliary coupling 4.

In the case of this Embodiment 4, one or more reset elements 21 are disposed between the flange 11 and the switching member 6. When the activation element 5 is actuated, the switching member 6 is therefore moved in the direction toward the first friction surface 2.1 on the drive element 2, counter to the force of these reset elements 21. When the activation element 5 is de-actuated, the switching member 6 is moved in the direction toward the switching start position 7, as a result of the reset force of the reset element 21.

It is advantageous if the reset elements 15 engage on the locking bodies in such a manner that they bring their operative surface 16 out of engagement with the operative surface 2.3 on the drive element 2 below a specific speed of rotation of the power take-off element 3, even counter to a residual clamping moment. When the drive motor, not shown, is shut off, the locking bodies 13 are moved back into their starting position as the result of the force of the reset elements 15, and the force flow between drive element 2 and power take-off element 3 is interrupted.

REFERENCE SYMBOL LIST

| No. | Embodiment 1 | Embodiment 2 | Embodiment 3 | Embodiment 4 |
|---|---|---|---|---|
| 1 | switchable coupling | ← | ← | ← |
| 2 | drive element | ← | ← | ← |
| 2.1 | friction surface on the drive element 2 | ← | ← | ← |
| 2.2 | collar on the drive element 2 | ← | ← | ← |
| 2.3 | operative surface on the drive element 2 | ← | ← | ← |
| 3 | power take-off element | ← | ← | ← |
| 4 | auxiliary coupling | ← | ← | ← |
| 5 | activation system | ← | ← | ← |
| 6 | switching member | ← | ← | ← |
| 6.1 | friction surface on the switching member 6 | ← | ← | ← |
| 6.2 |  | guide region on the switching member 6 |  | guide region on the switching member 6 |
| 7 | switching start position | ← | ← | ← |
| 8 | switching intermediate position | ← | ← | ← |
| 9 | switching end position | ← | ← | ← |
| 11 | flange | ← | ← | ← |
| 11.1 | guide region on the flange 11 | ← | ← | ← |
| 12 | guide | ← |  |  |
| 12.1 |  |  | holding bolt | ← |
| 13 | locking body | ← | ← | ← |
| 13.1 | operative surface on the locking body 13 | ← | ← |  |
| 14 | stop | ← | ← | ← |
| 15 | reset element for locking body 13 | ← | ← | ← |
| 16 | operative surface on the locking body 13 | ← | ← | ← |
| 17 | groove | ← | ← |  |
| 17.1 | operative surface in the groove | ← | ← |  |

-continued

| No. | Embodiment 1 | Embodiment 2 | Embodiment 3 | Embodiment 4 |
|---|---|---|---|---|
| 18 | | holding element | | holding element |
| 19 | operative surface on the holding element 18 | ← | ← | ← |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A switchable coupling for selectively connecting a drive element and a power take-off element, comprising:
   an activation system operable at least one of electrically, mechanically, pneumatically or hydraulically, the activation system including a first switching member configured to be switched between a switching starting position and a switching end position; and
   an auxiliary coupling operatively connected to the power take-off element, the auxiliary coupling including a second switching member and a locking body supported on the auxiliary coupling, wherein
      the activation system is disposed between the drive element and the power take-off element,
      in the switching end position of the first switching member, a first friction surface of the first switching member engages a second friction surface of the drive element such that an operative connection for transfer of torque between the drive element and the auxiliary coupling is formed,
      the locking body is arranged on the auxiliary coupling in a manner which permits the locking body to move counter to a force of a locking body reset element into an engaged position in which the locking body engages the drive element for transfer of torque from the drive element to the auxiliary coupling when the auxiliary coupling is rotating above a predetermined rotation speed,
      the locking body remains in the engaged position after de-actuation of the activation system by moving the second switching member from the switching end position toward of the switching start position until the auxiliary coupling is rotating below an auxiliary coupling opening rotation speed at which the locking body reset element moves the locking body out of engagement with the drive element.

2. The switchable coupling according to claim 1, wherein the auxiliary coupling includes a flange connection with the power take-off element, the flange connection including a stop, the locking body reset element and at least one of a holding bolt and a guide,
   the locking body is supported on the at least one of the holding bolt and the guide in a manner permitting movement of the locking body,
   the movement of the locking body about the at least one of the holding bolt and the guide is limited in at least one direction by the stop, and
   the locking body reset element biases the locking body against the stop.

3. The switchable coupling according to claim 2, wherein the locking body reset element is arranged to engage the locking body such that the locking body is movable out of engagement with at least one of a groove and an operative surface of the driving element below the auxiliary coupling opening rotation speed counter to a residual clamping moment and a centripetal acceleration force.

4. The switchable coupling according to claim 3, wherein the flange is displaceable along an axis of rotation of the power take-off element while transferring torque from the flange to the power take-off element, and
   the flange is operably connected to the second switching member.

5. The switchable coupling according to claim 4, wherein the flange includes a first guide region arranged to engage a second guide region of the second switching member, and
   the flange is arranged to displace the second switching member to the switching end position to permit torque transfer from the driving element via the switching member and the flange to the power take-off element when the flange is displaced along the axis of rotation of the power take-off.

6. The switchable coupling according to claim 5, wherein the activating system is configured to displace the second switching member counter to the force of a second switching member reset element from the switching start position to the switching end position by actuation of the activation system, and
   the second switching member reset element is configured to displace the second switching member from the switching end position into the switching start position by de-actuation of the activation system.

7. The switchable coupling according to claim 6, wherein the locking body includes a first operative surface,
   one of the second switching member and the drive element includes a second operative surface,
   the first and second operative surfaces are arranged such that
      when the second switching member moves in through a switching intermediate position between the switching starting and end positions in the direction of the switching end position the first and second operative surfaces engage in a manner which hinders movement of the locking body about the at least one of the holding bolt and the guide, and
      when the second switching member moves through the switching intermediate position in the direction of the switching start position the first and second operative surfaces disengage to permit the locking body to move without being hindered.

8. The switchable coupling according to claim 7, wherein a center of gravity of the locking body is located outside an axis of rotation of the locking body about the holding bolt such that at a predetermined lift off rotation speed of the auxiliary coupling power the locking body lifts off from the stop and move counter to the locking body reset element, and a third operative surface of the locking body is arranged to engage a fourth operative surface of the drive element in a friction-fit clamping connection for transfer of torque from the drive element to the power take-off element via the auxiliary coupling.

9. The switchable coupling according claim 7, wherein the locking body is movable relative to the at least one of the holding bolt and the guide counter to the force of the locking body reset element in response to the centripetal acceleration force such that a third operative surface of the locking body configured to engage a fourth operative surface of the driving element comes into a shape-fit operative connection to transfer torque from the drive element to the power take-off element.

10. The switchable coupling according to claim 1, wherein the activation element is an electromagnet, when the electromagnet is actuated, the first switching member is moved from the switching start position to the first switching end position counter to the force of a switching member reset element, and after de-actuation of the electromagnet, the first switching member is moved from the switching end position to the switching start position by the first switching member reset element.

\* \* \* \* \*